United States Patent
Kraemer et al.

(10) Patent No.: US 10,891,266 B2
(45) Date of Patent: Jan. 12, 2021

(54) FILE HANDLING IN A HIERARCHICAL STORAGE SYSTEM

(71) Applicant: International Business Machines Corporation, Armonk, NY (US)

(72) Inventors: Hans-Guenter Kraemer, Mainz (DE); Peter Muench, Mainz (DE); Rolf Schaefer, Mainz (DE); Norbert J. Schuld, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 14/022,537

(22) Filed: Sep. 10, 2013

(65) Prior Publication Data

US 2014/0101158 A1 Apr. 10, 2014

(30) Foreign Application Priority Data

Oct. 4, 2012 (GB) .................................. 1217733.3

(51) Int. Cl.
*G06F 16/185* (2019.01)
*G06F 16/10* (2019.01)

(52) U.S. Cl.
CPC ............ *G06F 16/185* (2019.01); *G06F 16/10* (2019.01)

(58) Field of Classification Search
CPC ................................................... G06F 16/185
See application file for complete search history.

(56) References Cited

U.S. PATENT DOCUMENTS

| 7,546,601 | B2 | 6/2009 | Byrd et al. |
| 7,610,329 | B2 * | 10/2009 | Bone ................. G06F 17/30067 707/999.002 |
| 7,630,955 | B2 | 12/2009 | Byrd et al. |
| 7,661,135 | B2 | 2/2010 | Byrd et al. |
| 7,805,470 | B2 | 9/2010 | Armangau et al. |
| 7,877,362 | B2 | 1/2011 | Gokhale et al. |
| 8,006,111 | B1 | 8/2011 | Faibish et al. |
| 8,099,758 | B2 * | 1/2012 | Schaefer ............. H04L 63/0428 726/1 |
| 8,943,032 | B1 * | 1/2015 | Xu ..................... G06F 17/30079 707/661 |
| 8,949,208 | B1 * | 2/2015 | Xu ........................ G06F 3/0641 707/661 |

(Continued)

OTHER PUBLICATIONS

"Data Management", https://support.scinet.utoronto.ca/wiki/index.php/Data_Management, retrieved Aug. 5, 2013, 12 pages.

(Continued)

*Primary Examiner* — Ashish Thomas
*Assistant Examiner* — Mellissa M. Ohba
(74) *Attorney, Agent, or Firm* — Francis Lammes; Stephen J. Walder, Jr.; Robert M. Sullivan

(57) ABSTRACT

A user virtual file system within a hierarchical storage system performs file handling. A user virtual file system scans, reads and analyses data or user behavior to create or modify at least one rule or metadata. The user virtual file system identifies logical or temporal relationships of files based on the at least one rule or the metadata. The user virtual file system groups identified related files in the at least one container. The user virtual file system moves the at least one container to different tiers of storage based on the at least one rule or the metadata.

15 Claims, 5 Drawing Sheets

(56) References Cited

U.S. PATENT DOCUMENTS

| | | |
|---|---|---|
| 2006/0036579 A1 | 2/2006 | Byrd et al. |
| 2006/0059118 A1 | 3/2006 | Byrd et al. |
| 2007/0260592 A1 | 11/2007 | Anglin et al. |
| 2008/0091739 A1* | 4/2008 | Bone .................. G06F 17/30067 |
| 2009/0222453 A1* | 9/2009 | Naineni ............ G06F 17/30132 |
| 2010/0115049 A1* | 5/2010 | Matsunaga ............ G06F 3/0626 |
| | | 709/216 |
| 2010/0299547 A1 | 11/2010 | Saika |
| 2010/0318500 A1 | 12/2010 | Murphy et al. |
| 2011/0282830 A1* | 11/2011 | Malige .............. G06F 17/30221 |
| | | 707/609 |
| 2012/0030179 A1 | 2/2012 | Kauffman et al. |

OTHER PUBLICATIONS

Allcock, Bill et al., "Data Management and Transfer in High-Performance Computational Grid Environments", Elsevier, Parallel Computing, vol. 28, No. 5, May 2002, pp. 749-771.

Wildani, Avani et al., "Semantic Data Placement for Power Management in Archival Storage", IEEE, Petascale Data Storage Workshop (PDSW), Nov. 2010, 5 pages.

* cited by examiner

FILE HANDLING IN A HIERARCHICAL STORAGE SYSTEM

BACKGROUND

The present invention relates to the field of hierarchical storage systems, and, more specifically, to file handling in a hierarchical storage system. Still more specifically, the present invention relates to a data processing program and a computer program product for file handling in a hierarchical storage system.

To optimize the efficiency of large storage systems like e-mail hosts, clouds or other network attached storage systems the data should be at the right time at the right place for the right cost. Solutions like hierarchical storage management (HSM) and file systems like General Parallel File Systems (GPFS) are used in this context. In practice the existences of a larger number of small files is in general a problem for systems like hierarchical storage management (HSM) and General Parallel File System (GPFS) because these systems cannot handle large amount of small files efficiently.

In the following example this typical problem is explained. A scale out file system storage customer stored thousands of short mp3 files (bird-calls) over a long period of time, for several years, for example, and tried to recover these files several years later. The files have been stored sequentially on a Network Attached Storage (NAS) system, implemented as scale out file system storage, in a university environment. All files have different "last access" time stamps. The system managed the whole campus data comprising several hundred terabytes. The data was filed from disk (first tier or second tier) to tape (third tier) managed by hierarchical storage management (HSM) due to not being accessed for a long time. The complete work, i.e. all files belonging to one user, was filed on many tapes, because the hierarchical storage management (HSM) does not take into account that all data for one user should be concentrated on only one or a small number of tapes to enable fast restore. The hierarchical storage management (HSM) migrates the mp3 files and all other files from all users to tape, based on the time stamps of the last access. Hence the mp3 files are distributed to more than a hundred of tapes grouped by the last access time. Now the user wanted to access all of his mp3 files. This would have taken several years (roundabout more than 25 years) using the hierarchical storage management (HSM) with the scale out file system storage. This is because the files are requested from tape in a specific order (e.g. alphabetically) by the operating system of the user which might be inefficient for the hierarchical storage management (HSM).

This is a typical conflict of hierarchical storage management (HSM) systems. The hierarchical storage management (HSM) wants to be transparent for the end-users operating system, and the end-user operating system should know that the hierarchical storage management (HSM) is working in background to optimize the request order of the files.

In this example the scale out file system storage system administrator used special hierarchical storage management (HSM) commands to restore the data efficiently, which is not applicable to standard user. The user could prevent this problem by archiving all files in one single archive file. Hence these mp3 files are always in the archive. To do this additional utilities and/or software should be used. This is additional work and it contradicts the concept of hierarchical storage management (HSM) to be transparent if the archive process would be seen as part of hierarchical storage management (HSM). The known solutions are only working around the basic problem. To apply known solutions either special skill or additional work/actions for the user is required.

The problem of small files in hierarchical storage management (HSM) systems and/or general parallel file systems (GPFS) and their possible solutions are world-wide discussed. The hierarchical storage management (HSM) should not be used to store large numbers of files with the expectation that they can be retrieved quickly. It can take a significant amount of time to recall a file and quite a long amount of time to recall many files; for example, recalling 1000 small files would take over a day. Rather than storing a large number of files, hierarchical storage management (HSM) users should combine them into a few archive files using an additional utility. The archive files should then be stored. When it is time to recall a collection of files, the archive files can be recalled relatively quickly, and the desired files extracted.

Further, the relocation of many thousands (or millions) of small files should be avoided. It's very demanding on the system to constantly scan/reconcile all these files on the file system, tapes, metadata and database. It is also to consider that pulling back an individual tiny file could still take as long as five to eight minutes.

In the Patent Publication U.S. Pat. No. 7,805,470 B2 by Armangau et al. methods and Apparatus for managing the storage of content in a file system is disclosed. One disclosed embodiment is directed to the containerization of logically distinct content units, so that multiple distinct content units can be stored in the same file, called a container file, in a file system. Each content unit may have an identifier associated with it. When an accessing entity requests access to a previously-stored content unit and provides the identifier for the content unit, the identifier may be used to locate the container file in which the content unit is stored. Further, a method of storing related files in a single container in a hierarchical storage management system is disclosed. The disclosed system stores logically separate content units in a single container. Further, users store and retrieve content units without knowledge that the content units have been stored in container files with other content units.

In the Patent Publication U.S. Pat. No. 7,877,362 B2 by Gokhale et al. a system and method for containerized data storage and tracking are disclosed. The disclosed method of grouping data into a container is based on common characteristics of the data in a hierarchical storage system. Here, data is stored in containers based on storage preferences. The storage preferences include storing same class of data in a container and automatically aggregating the data in the container. The container may be tracked by the system instead of individually tracking and monitoring each of the data items and storage media contained in the container. The location of the container is tracked within the storage system and at offsite storage, for administrative, reporting or other uses.

SUMMARY

The illustrative embodiment provides for file handling in a hierarchical storage system. The illustrative embodiment implements a user virtual file system for each user, the user virtual file system comprising a user interface, a set of data containers, and a control unit. In the illustrative embodiment, the user virtual file system scans, reads, and analyses data or user behavior to create or modify at least one rule or metadata. The illustrative embodiment identifies logical or temporal relationships of files based on at least one rule or the metadata. The illustrative embodiment groups identified related files in at least one container. The illustrative embodiment moves the at least one container to different tiers of storage based on the at least one rule or the metadata.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

A preferred embodiment of the present invention, as described in detail below, is shown in the drawings, in which.

DETAILED DESCRIPTION

Figure 1:
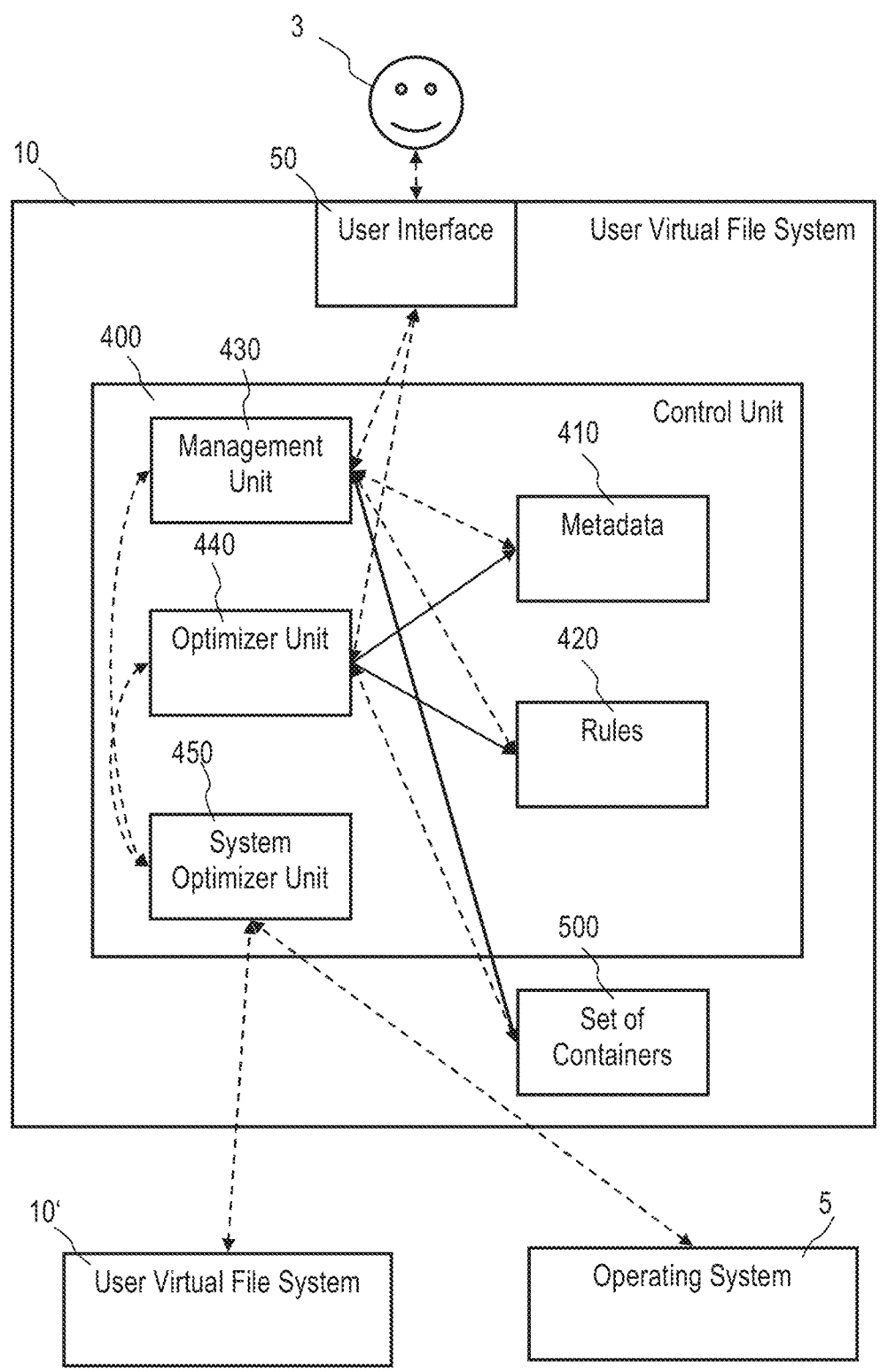
FIG. 1 is a schematic block diagram of a user virtual file system used in a system for file handling in a hierarchical storage system, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
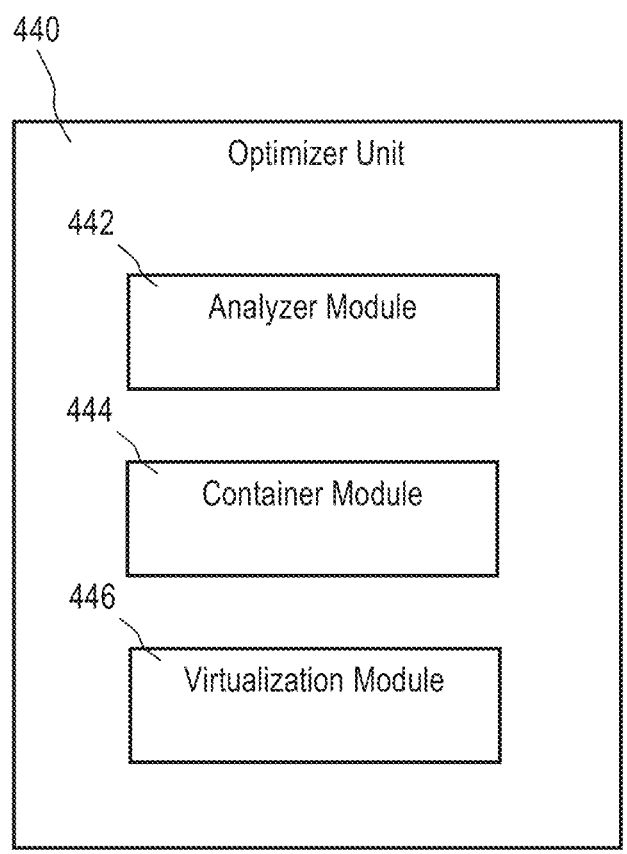
FIG. 2 is a schematic block diagram of an optimizer unit of the user virtual file system shown in FIG. 1 used in a system for file handling in a hierarchical storage system, in accordance with an embodiment of the present invention.
Figure 3:
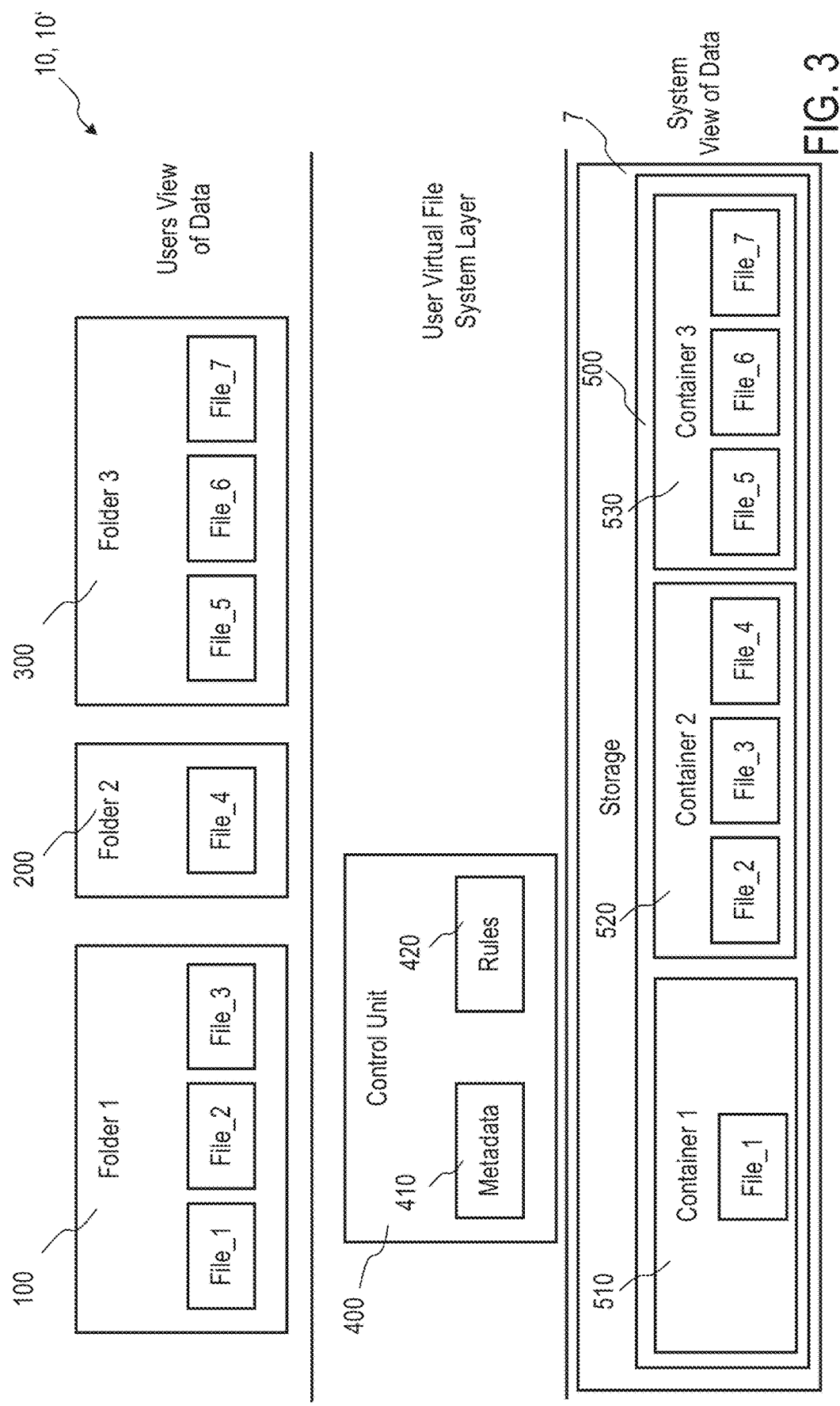
FIG. 3 is a schematic block diagram of exemplary data managed by a method and a system for file handling in a hierarchical storage system, in accordance with an embodiment of the present invention.
Figure 4:
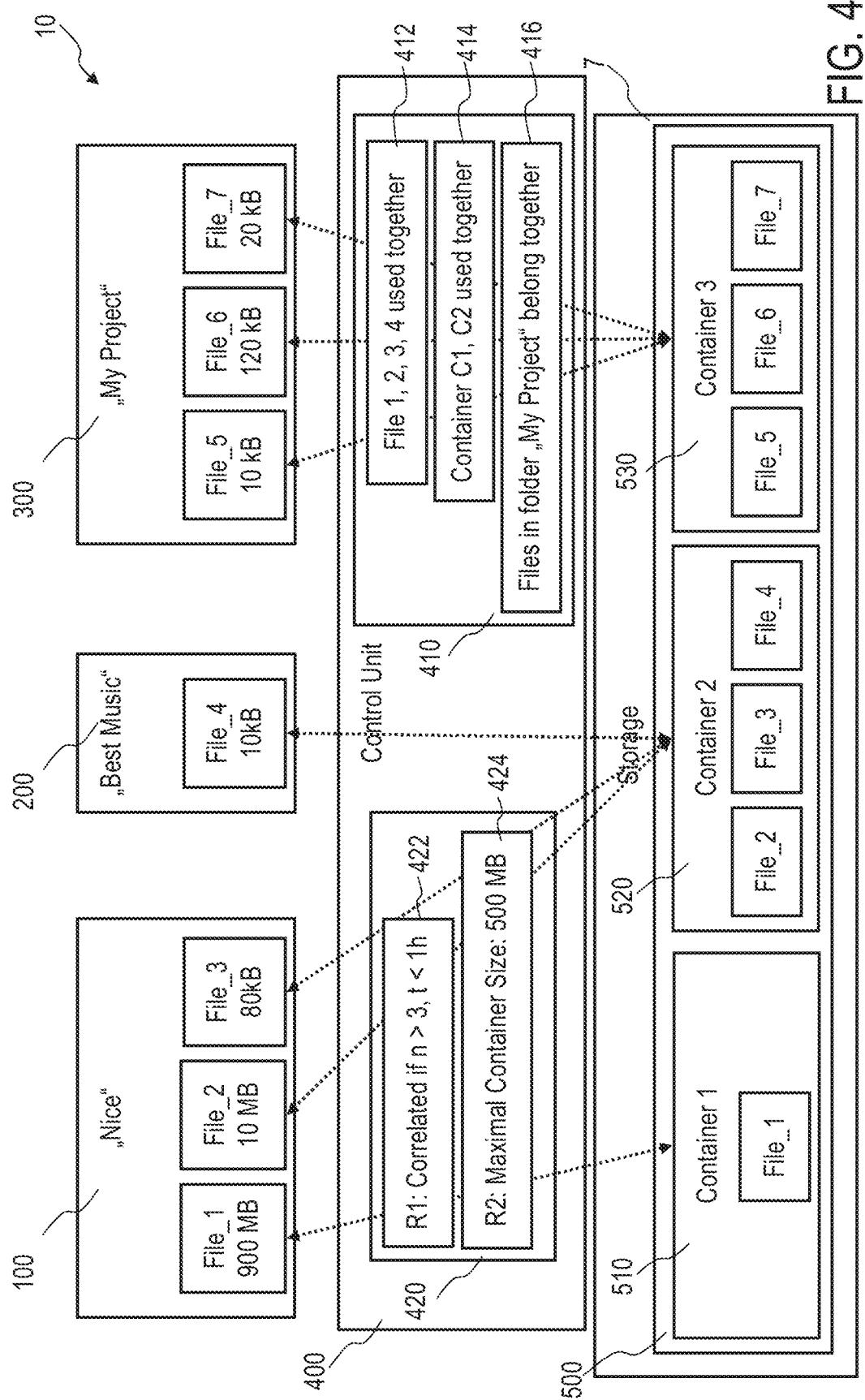
FIG. 4 is a schematic block diagram of an user account managed by a method and a system for file handling in a hierarchical storage system, in accordance with an embodiment of the present invention.

FIG. 1 shows a user virtual file system 10 used in a system for file handling in a hierarchical storage system, in accordance with an embodiment of the present invention; and FIG. 2 shows an optimizer unit 440 of the user virtual file system 10 shown in FIG. 1 used in a system for file handling in a hierarchical storage system, in accordance with an embodiment of the present invention. FIG. 3 shows exemplary data managed by a method and a system for file handling in a hierarchical storage system, in accordance with an embodiment of the present invention. FIG. 4 shows a user account managed by a method and a system for file handling in a hierarchical storage system, in accordance with a first embodiment of the present invention.

Referring to FIG. 1 to 4, a user virtual file system 10, 10' for each user 3 comprises a user interface 50, a set of data containers 500, and a control unit 400. The control unit 400 comprises a management unit 430, an optimizer unit 440 and a system optimizer unit 450. The optimizer unit 440 scans, reads and analyses data or user behavior to create or modify at least one rule 420, 422, 424 or metadata 410, 412, 414, 416 which are stored in the control unit 400, for example. The optimizer unit 440 identifies logical and/or temporal relationships of files File_1, File_2, File_3, File_4, File_5, File_6, File_7 based on at least one rule 420, 422, 424 or metadata 410, 412, 414, 416, and groups identified related files in at least one container 510, 520, 530; wherein the management unit 430 moves at least one container 510, 520, 530 containing plurality of related files File_1, File_2, File_3, File_4, File_5. File_6, File_7 to different tiers of storage based on at least one rule 420, 422, 424 or metadata 410, 412, 414, 416. In the shown embodiment the system optimizer unit 450 builds a communication network between different user virtual file systems 10, 10' and an operating system 5. In FIG. 1 the solid lines represent an active action which is changing something, e.g. moving a container 510, 520, 530, creating and/or modifying a rule 420, 422, 424 or metadata 410, 412, 414, 416; and the dashed lines represent a passive action, which is a read only action, e.g. reading a file File_1, File_2, File_3, File_4, File_5, File_6, File_7 in a container 510, 520, 530 or a rule 420, 422, 424 or metadata 410, 412, 414, 416.

Still referring to FIG. 1 to 4, the optimizer unit 440 analyzes and predicts individual user behavior, data moving operations, and system status. Therefore the optimizer unit 440 comprises an analyzing module 442 for analyzing data or user behavior, a container module 444 for creating the at least one container 510, 520, 530, and a virtualization module 446 to virtualize a physical file layout created by the container module 444. The management unit 430 manages containers 510, 520, 530 of one particular user 3 utilizing the optimizer unit 440 and/or the system optimizer unit 450 to communicate with other user virtual file systems 10' and/or the operating system 5 to move the at least one container 510, 520, 530 to an appropriate tier of storage. The management unit 430 moves the at least one container 510, 520, 530 of corresponding grouped files File_1, File_2, File_3, File_4, File_5, File_6, File_7 entirely to a primary tier of storage if the optimizer unit 440 predicts oncoming usage of the grouped files File_1, File_2, File_3, File_4, File_5, File_6, File_7 within a certain time range.

Referring to FIGS. 3 and 4, the user virtual file system 10, 10' comprises a native storage 7 to store the set of containers 500 for the data and the control unit 400 to perform the corresponding operations. The control unit 400 uses rules 420, 422, 424 and metadata 410, 412, 414, 416 to know what it has to do with the data. The user view of data is identical to a standard file system with a plurality of folders 100, 200, 300 with corresponding files "File_1", "File_2", "File_3", "File_4", "File_5", "File_6", "File_7" while the data is physically stored in the containers 510, 520, 530 of the native storage 7, which is the system view of data. The user virtual file system 10, 10' is the connector between these views. In the shown embodiment a first folder 100 comprises three files "File_1", "File_2", "File_3", a second folder 200 comprises one file "File_4" and a third folder 300 comprises three files "File_5", "File_6", "File_7". A first file "File_1" is stored in a first container 510, a second, third and fourth file "File_2", "File_3", "File_4" are stored in a second container 520, and a fifth, sixth and seventh file "File_5", "File_6", "File_7" are stored in a third container 530.

In the shown embodiment, the control unit 400 stores user input as metadata 410, 416 or rule 420, 422, 424 and generates metadata 410, 412, 414 automatically by monitoring user action and scanning files "File_1", "File_2", "File_3", "File_4", "File_5", "File_6", "File_7". Further the control unit 400 identifies relationships of files "File_1", "File_2", "File_3", "File_4", "File_5", "File_6", "File_7" based on at least one rule 420, 422, 424 or metadata 410, 412, 414, 416; and groups identified related files "File_1", "File_2", "File_3", "File_4", "File_5", "File_6", "File_7" in at least one container 510, 520, 530. The at least one container 510, 520, 530 containing plurality of related files "File_1", "File_2", "File_3", "File_4", "File_5", "File_6", "File_7" is moved to different tiers of storage based on at least one rule 420, 422, 424 or metadata 410, 412, 414, 416.

The user virtual file system 10, 10' provides the following operations using the control unit 400 and the containers 510, 520, 530: If the user 3 disconnects from the hierarchical storage system the user virtual file system 10, 10' goes automatically off-line or inactive. If the user 3 connects to the hierarchical storage system, the user virtual file system 10, 10' goes automatically on-line or active. At any time data can be moved independently to any physical storage device 7. The rules are defined by the host system policies when the user virtual file system 10, 10' is inactive and by user virtual file system policies when the user virtual file system 10, 10' is active. While the user virtual file system 10, 10' is on-line the user 3 has full access with full performance to his data. While the user 3 is off-line the system has full control over the data of the user virtual file system 10, 10' to optimise its data handling. A user virtual file system container is a set of files "File_1", "File_2", "File_3", "File_4", "File_5", "File_6", "File_7" accessed and controlled by the user 3 and logically connected to metadata 410, 412, 414, 416 controlled by the control unit 400. Files "File_1", "File_2", "File_3", "File_4", "File_5", "File_6", "File_7" and metadata 420, 422, 424 are logically connected and could be stored independently. The user virtual file system 10, 10' can store data in corresponding containers 510, 520, 530 or natively on the underlying storage system 7. Natively stored data is equivalent to a user virtual file system container and is also logically connected to some metadata 410, 412, 414, 416. The user virtual file system 10, 10' could detect dependencies between data by monitoring user actions, scanning files, use user input and store this information as user virtual file system metadata 410, 412, 414, 416. The control unit 400 could use prediction methods to minimize any latencies of data handling or response. The algorithms can be modified and/or updated at any time by an authorized person, e.g. user 3, administrator. The algorithms operate on user virtual file system metadata 410, 412, 414, 416 and other useful information. The user virtual file system 1 provides a user interface to create user virtual file system metadata 410, 412, 414, 416 and to maintain and/or modify the rules 420, 422, 424 and algorithms. All operations are transparently to the user of the user virtual file system 10, 10'. The user virtual file system 10, 10' can join or split containers 510, 520, 530. The user virtual file system 10, 10' can compress and decompress data at any time. E.g. when a container 510, 520, 530 is loaded data are decompressed, when user virtual file system 10, 10' goes off-line all decompressed data are compressed again.

When the user virtual file system 10, 10' is off-line some data containers 510, 520, 530 can stay on high performance storage, some other containers can be migrated to an archive system like a tape library. The control unit 400 is inactive during this period. Even if the control unit 400 is inactive it can monitor and track the data moving operations of the operating system 5 to collect useful information. The movement of data is controlled by the policy defined on the host system. e.g. hierarchical storage management (HSM) policies. When the user virtual file system 10, 10' is on-line, the control unit 400 is active. Based on the policies defined for the user virtual file system 10, 10' some data can be recalled from the tape library to the first tier storage while other data containers stay at their current location. These actions are driven by the control unit 400 of the user virtual file system 1.

Referring to FIG. 4, a user 3 has a game represented by "File_1". When playing the game "File_1", music represented by "File_2", "File_3", "File_4" is played as defined by one of his playlists. These files "File_1", "File_2", "File_3", "File_4" are located in different folders 100, 200 represented by the first folder "Nice" 100 and the second folder "Best Music" 200. The user had played the game "File_1" and the playlist five times until now.

Still referring to FIG. 4, the rules 420 of the user virtual file system 10 comprise two rules 422, 424. According to a rule "R1" 422 files are correlated if they are accessed within one hour and if this happened more than three times. According to a rule "R2" 424, a maximum container size is 500 MB. The user virtual file system rules 420 and metadata 410 are enabled, and the metadata information: "All files in the folder "My project" belong together" is defined. In shown embodiment the user virtual file system 10 comprises automatically generated metadata 412, 414 and user-generated metadata 416 as metadata 410. According to automatically generated metadata 412 the files "File_1", "File_2", "File_3", "File_4" are used together, because of the rule "R1" 422. According to automatically generated metadata 414 containers 510 and 520 are used together, because of conflict between the first rule "R1" 422 and the second rule "R2" 424 if file "File_1" with a size of 900 MB would be stored in the same container as files "File_2", "File_3", "File_4". According to first user-generated metadata 416 all files represented by "File_5", File_6" and "File_7" in the third folder "My Project" 300 belongs together.

The user virtual file system 10 stores the first file "File_1" natively in the first container 510 because its size is lager then 500 MB. The first file "File_1" is managed as first container 510. The second file "File_2" with a size of 10 MB, the third file "File_3" with a size of 80 kB, and the fourth file "File_4" with a size of 10 KB, are stored in the second container 520, because the user virtual file system 10 has detected a correlation between the files "File_1", "File_2", "File_3", "File_4", based on the first rule "R1" 422. The first and second container 510, 520 are used together because the files "File_1", "File_2", "File_3", "File_4" are correlated but stored in different containers 510, 520. The fifth file "File_5" with a size of 10 kB, the sixth file "File_6" with a size of 120 kB, and the seventh file "File_7" with a size of 20 kB, are stored in the third container 530, because of the user-created meta data 416, that the files "File_5", "File_6", "File_7" in the third folder "My project" 300 belong together.

In the shown embodiment the hierarchical storage system has two tiers, a first tier for user access and a second tier for migrated files. The system policy migrate all files not used in the last 24 hours from the first tier to the second tier.

In a first data management scenario at the weekend (Saturday, Sunday) the user 3 is playing but not working. Therefore the first and second container 510, 520 are stored on the first tier while the third container 530 is stored on the second tier. So the user 3 has fast access to the game and music but slow access to his project data on weekends.

On Monday the user 3 starts to work. When he tries to access e.g. the fifth file "File_5", the third container 530 with the files "File_5", "File_6", "File_7" is moved from the second tier to the first tier. The user 3 notices a delay. Now the user 3 has fast access to all of his project data in the third folder "My Project" 300, comprising the files "File_5", "File_6", "File_7".

At Monday evening, when the user 3 disconnects from the system the first and second container 510, 520 are moved from the first tier to the second tier because they were not accessed in the last 24 hours. At all other working days the user 3 has fast access to his project data in the third folder "My Project" 300 until the first and second container 510 and 520 are migrated to the first tier at Saturday while he is not working at the weekend.

In a second data management scenario, the user virtual file system 10 reads the system policy: "migrate all files not used in the last 24 hours from first tier to second tier" and creates a corresponding user virtual file system rule "Move all containers to the second tier when the user disconnects and restore all containers used in the last 24 hours when user connects to the system". The user virtual file system 10 also learns "when a container is used" and creates the rule: "Third Container needed on Monday to Friday, first and second container needed on Saturday and Sunday". Instead of learning this rule it can be created by the user 3 through the user interface 50 provided by the user virtual file system 10. When the user 3 is disconnected from the system, all containers 510, 520, 530 are stored on the second tier. When the user 3 connects on Saturday or Sunday the first and second container 510, 520 are preloaded from the second tier to the first tier at his log-on. The user 3 does not notice any delay. On Monday to Friday the first container 510 and the second container 520 are not preloaded but the third container 530 is preloaded. The user 3 does not notice any delay when he starts working on the project of the third folder "My Project" 300. On Saturday and Sunday the third container 530 is not preloaded but the first and second container 510, 520 are preloaded. The user 3 does not notice any delay when the game or music is started.

Figure 5:
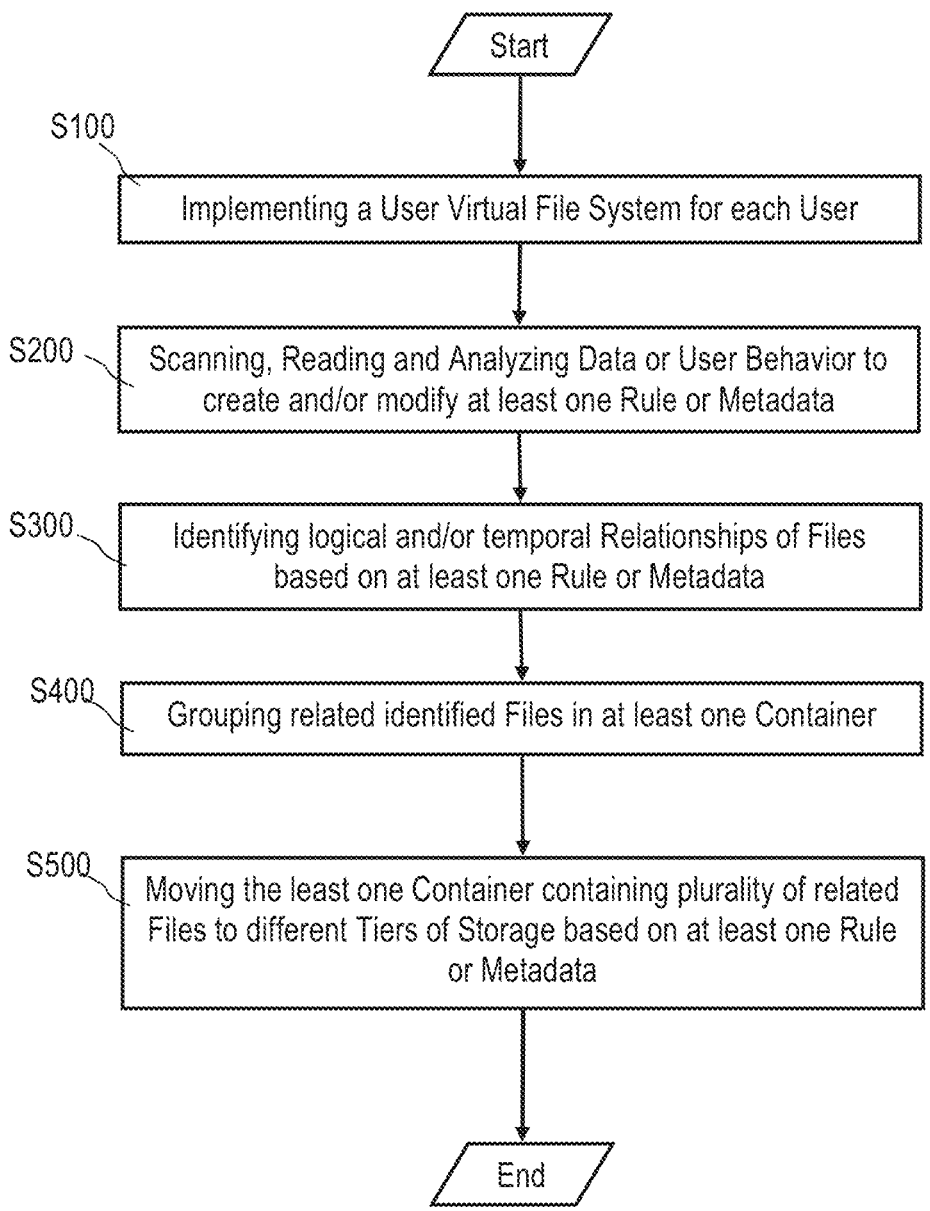
FIG. 5 is a schematic flowchart of a method for file handling in a hierarchical storage system, in accordance with an embodiment of the present invention.

Referring to FIG. 5, a method for file handling in a hierarchical storage system implements a user virtual file system 10 for each user 3 comprising an interface unit 50, a set of data containers 500, and a control unit 400 in step S100. In Step S200 data and/or user behavior are scanned, read and analyzed to create and/or modify at least on rule 420, 422, 424 or metadata 410, 412, 414, 416. In step S300, logical and/or temporal relationships of files "File_1", "File_2", "File_3", "File_4", "File_5", "File_6", "File_7" are identified based on at least one first rule 420, 422, 424 or metadata 410, 412, 414, 416. In step S400 related identified files "File_1", "File_2", "File_3". "File_4", "File_5", "File_6". "File_7" are grouped in at least one container 510, 520, 530. In step S500 the least one container 510, 520, 530 containing plurality of related files "File_1", "File_2", "File_3", "File_4", "File_5", "File_6", "File_7" is moved to different tiers of storage 500 based on at least one rule 420 or metadata 410.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for file handling in a hierarchical storage system comprising:
    implementing a user virtual file system for each a plurality of users, the user virtual file system comprising a user interface, a set of data containers, and a control unit, wherein the user virtual file system scans, reads, and analyzes data associated with a plurality of files and user behavior associated with the plurality of files to create or modify a set of rules for handling the plurality of files and to create or modify a set of metadata for handling the plurality of files;
    identifying logical or temporal relationships between subsets of files in the plurality of files based on the set of rules and the set of metadata;
    grouping a subset of files that are identified as having a logical or temporal relationship based on the set of rules and the set of metadata in at least one data container;
    moving the at least one data container containing the subset of files to a different tier of storage based on the set of rules and the set of metadata that caused the subset of files that are identified as having the logical or temporal relationship to be grouped; and
    analyzing and predicting individual user behavior and the system status, wherein the at least one data container of corresponding grouped files is moved entirely to a primary tier of storage if oncoming usage of the grouped files within a certain time range is predicted.

2. The method according to claim 1, wherein the plurality of files and the set of rules and the set of metadata are logically connected.

3. The method according to claim 1, wherein the set of rules and the set of metadata comprise at least one of the following information: an access pattern of files in sequence by same users or across users, files in a shared folder, files belonging to a same user, links between files, defined maximum size of container, plurality of related files of the at least one data container not used for a certain time range, or system status.

4. The method according to claim 3, wherein the system status comprises at least one of the following information: user disconnection from a file share comprising the at least one data container, user virtual file system is offline, user access to at least one related file of the at least one data container, user connection to a file share comprising the at least one data container, or the user virtual file system goes online.

5. The method according to claim 3, wherein the access pattern is defined by a time range and a number of accesses during the time range.

6. A system for file handling in a hierarchical storage system, the system comprising:
    a processor; and
    a memory coupled to the processor, wherein the memory comprises instructions which, when executed by the processor, cause the processor to:
    implement a user virtual file system for each a plurality of users, the user virtual file system comprising a user interface, a set of data containers, and a control unit, wherein the user virtual file system scans, reads, and analyzes data associated with a plurality of files and user behavior associated with the plurality of files to create or modify a set of rules for handling the plurality of files and to create or modify a set of metadata for handling the plurality of files;
    identify logical or temporal relationships between subsets of files in the plurality of files based on the set of rules and the set of metadata;
    group a subset of files that are identified as having a logical or temporal relationship based on the set of rules and the set of metadata in at least one data container;
    move the at least one data container containing the subset of files to a different tier of storage based on the set of rules and the set of metadata that caused the subset of files that are identified as having the logical or temporal relationship to be grouped; and analyze and predict individual user behavior and system status, wherein the at least one data container of corresponding grouped files is moved entirely to a primary tier of storage if oncoming usage of the grouped files within a certain time range is predicted.

7. The system according to claim 6, wherein the memory comprises instructions which, when executed by the processor, cause the processor to:
store user input as the set of metadata for handling the plurality of files and the set of rules for handling the plurality of files; and
generate the set of metadata for handling the plurality of files automatically by monitoring user action and scanning files.

8. The system according to claim 6, wherein the memory comprises instructions which, when executed by the processor, cause the processor to:
build a communication network between different user virtual file systems and an operating system.

9. The system according to claim 6, wherein the memory comprises instructions which, when executed by the processor, cause the processor to:
analyze the data associated with a plurality of files and the user behavior associated with the plurality of files;
create the at least one container for the subset of files that are identified as having a logical or temporal relationship based on the set of rules and the set of metadata; and
virtualize a physical file layout of the at least one container.

10. The system according to 6, wherein the memory comprises instructions which, when executed by the processor, cause the processor to:
manage the at least one container of one particular user to communicate with other user virtual file systems or the operating system in order to move the at least one container to an appropriate tier of storage.

11. A computer program product comprising a non-transitory computer readable storage medium having a computer readable program stored therein, wherein the computer readable program, when executed on a computing device, causes the computing device to:
implement a user virtual file system for each of a plurality of users, the user virtual file system comprising a user interface, a set of data containers, and a control unit, wherein the user virtual file system scans, reads, and analyzes data associated with a plurality of files and user behavior associated with the plurality of files to create or modify a set of rules for handling the plurality of files and to create or modify a set of metadata for handling the plurality of files;
identify logical or temporal relationships between subsets of files in the plurality of files based on the set of rules and the set of metadata;
group a subset of files that are identified as having a logical or temporal relationship based on the set of rules and the set of metadata in at least one data container;
move the at least one data container containing the subset of files to a different tier of storage based on the set of rules and the set of metadata that caused the subset of files that are identified as having the logical or temporal relationship to be grouped; and
analyze and predict individual user behavior and the system status, wherein the at least one data container of corresponding grouped files is moved entirely to a primary tier of storage if oncoming usage of the grouped files within a certain time range is predicted.

12. The computer program product according to claim 11, wherein the plurality of files and the set of rules and the set of metadata are logically connected.

13. The computer program product according to claim 11, wherein the set of rules and the set of metadata comprise at least one of the following information: an access pattern of files in sequence by same users or across users, files in a shared folder, files belonging to a same user, links between files, defined maximum size of container, plurality of related files of the at least one data container not used for a certain time range, or system status.

14. The computer program product according to claim 13, wherein the system status comprises at least one of the following information: user disconnection from a file share comprising the at least one data container, user virtual file system is offline, user access to at least one related file of the at least one data container, user connection to a file share comprising the at least one data container, or the user virtual file system goes online.

15. The computer program product according to claim 13, wherein the access pattern is defined by a time range and a number of accesses during the time range.

* * * * *